United States Patent [19]

Suzuki et al.

[11] 4,078,154
[45] Mar. 7, 1978

[54] VOICE RECOGNITION SYSTEM USING LOCUS OF CENTROID OF VOCAL FREQUENCY SPECTRA

[75] Inventors: Matsumi Suzuki; Yoichi Ichikawa, both of Ebina, Japan

[73] Assignee: Fuji Xerox Co., Ltd., Tokyo, Japan

[21] Appl. No.: 712,993

[22] Filed: Aug. 9, 1976

[30] Foreign Application Priority Data

Aug. 9, 1975 Japan .................................. 50-97032

[51] Int. Cl.² .............................................. G10L 1/00
[52] U.S. Cl. ................................................. 179/1 SB
[58] Field of Search ................. 179/1 SB, 1 SC, 1 SD

[56] References Cited

U.S. PATENT DOCUMENTS 3,810,156   5/1974   Goldman ........................... 179/1 SB

OTHER PUBLICATIONS

Das, S. et al., "A Scheme for Speech Processing", IEEE Trans. Audio and EA, Mar. 1971.

Furui, S. et al., "Talker Recognition", Elec. and Comm. in Japan, vol. 56-A, No. 11, 1973.

*Primary Examiner*—Kathleen H. Claffy
*Assistant Examiner*—E. S. Kemeny
*Attorney, Agent, or Firm*—Sughrue, Rothwell, Mion, Zinn and Macpeak

[57] ABSTRACT

A voice recognition system is disclosed using the centroid of frequency spectra obtained by frequency analysis of a voice as the characteristic parameter of the voice. The locus of the centroid is obtained by periodically measuring, during the utterance of a selected phrase, the average frequency and the average amplitude. The locus constitutes a pattern of the centroid of frequency spectra and is stored in a memory. During recognition a person keys in a known address to extract the stored pattern of his voice from the memory and then reutters the key phrase. The centroid of freqency spectra is recalculated and the locus obtained is compared with the one in the memory. Humming distance is defined as the distance between a recorded locus of centroid of frequency and a newly inputted locus of centroid of frequency.

4 Claims, 12 Drawing Figures

FIG. 6
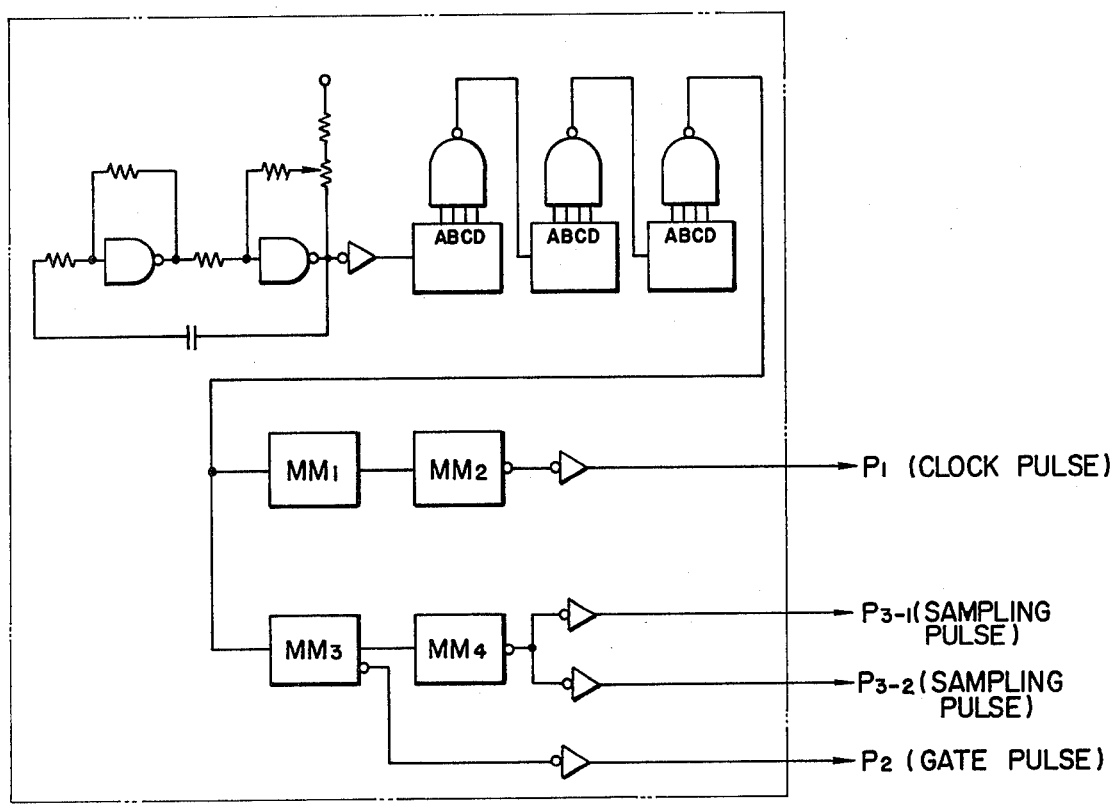
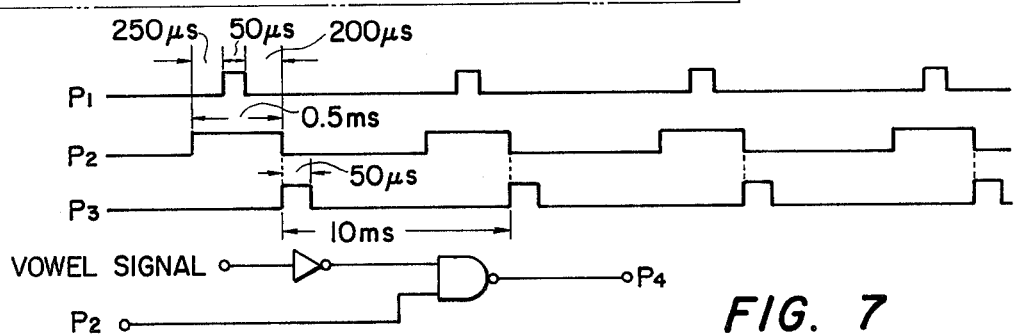
FIG. 7
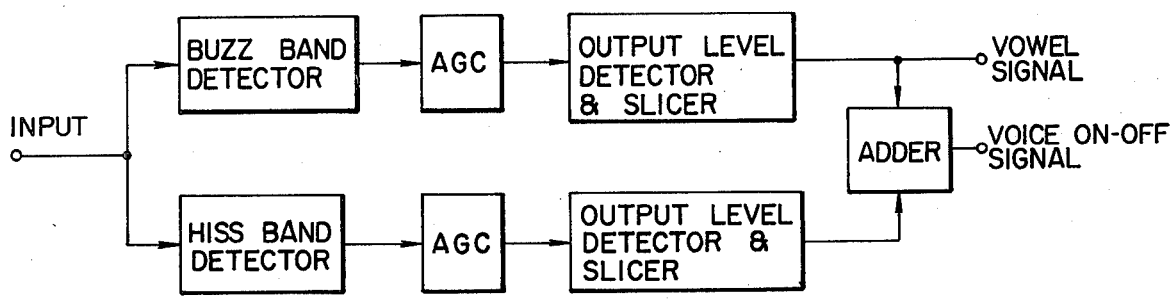

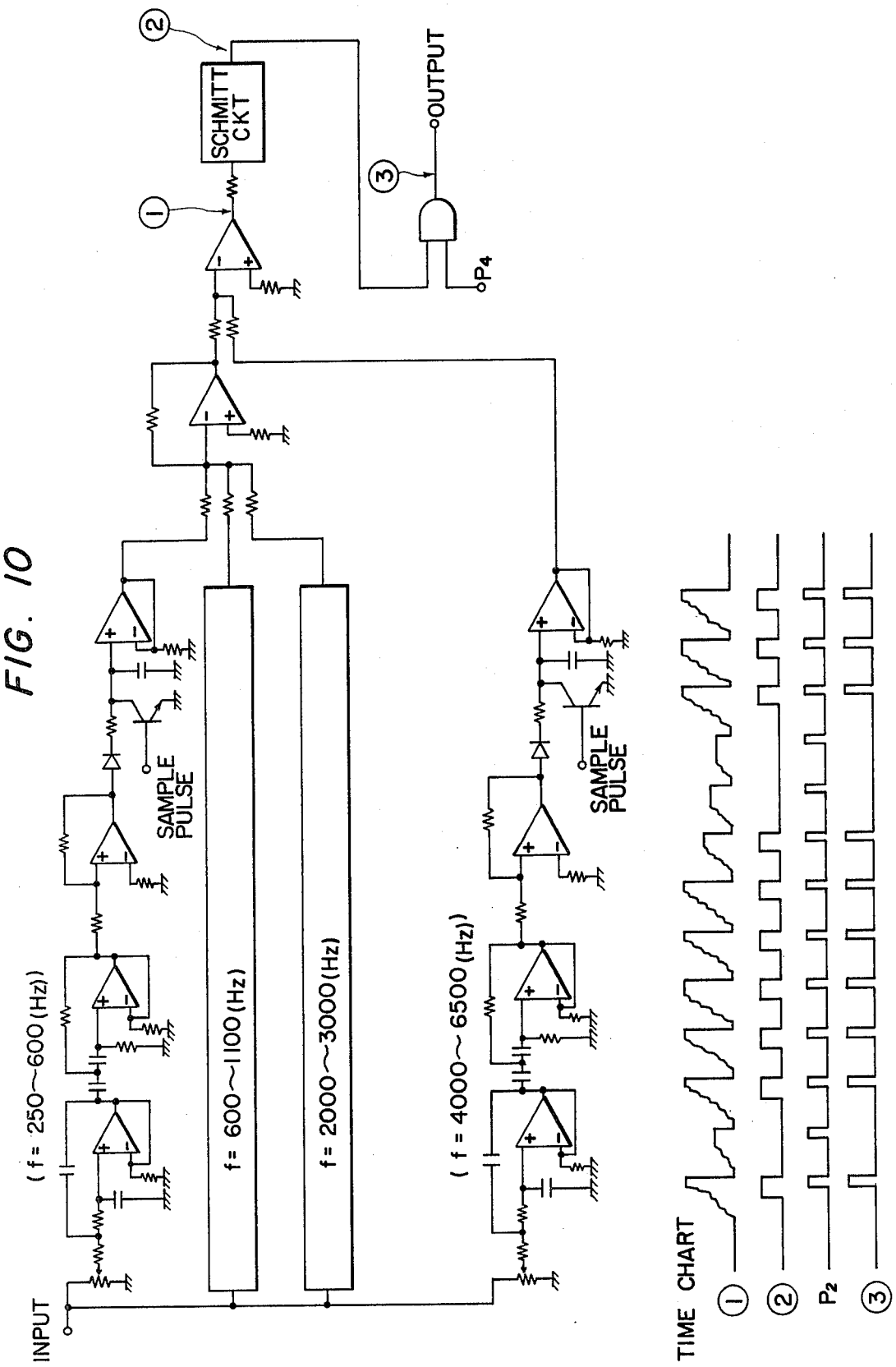

VOICE RECOGNITION SYSTEM USING LOCUS OF CENTROID OF VOCAL FREQUENCY SPECTRA

BRIEF DESCRIPTION OF THE INVENTION

This invention relates to a system for identifying individuals by using recorded vocal characteristics.

The desire and need for security systems which permit access only by specified personell have greatly increased. Many different systems are presently in use or under consideration in research laboratories. Such systems use various identifying parameters, such as, magnetically coded cards, finger print analysis, voice matching, etc.

Heretofore, systems for recognizing individuals by voice have utilized analysis of vocal figures or the formant frequencies. However, vocal figure analysis tends to identify an individual person irrespective of the level or strength and accentuation of the uttered voice, while the pursuit of formant frequencies employs prohibitively complicated variation of parameters for the identification of personalities, resulting in insufficiently precise recognition for practical applications. As a result of intensive studies to discover which part of the vocal frequency spectra represents a personality, it has been found that a personality is expressed relatively distinctively by the corellation between the position of each formant frequency and the normalized average amplitude. However, if the latter are used as parameters in the recognition of individuals, difficulties will be encountered in ensuring satisfactory precision of recognition due to complicated variations of parameters. Attention has been directed to the fact that a personality is expressed by a locus of shifting centroid of frequency spectra, which is easy to recognize while preserving the important elements that the formant frequency and average amplitude can provide in defining a personality. The "centroid of frequency spectra" is given in the form of the average frequency and average amplitude as a whole.

SUMMARY OF THE INVENTION

The instant invention contemplates, by utilization of the frequency spectra centroid, which expresses a personality, to determine a locus of transitionally changing centroid at the time of recording and at the time of collation of recognition, and to identify an individual by comparing the locus determined at the time of recognition with the recorded one. More particularly, a voice is frequency-analyzed through a bank of band-pass filters and then the centroids of the obtained frequency spectra are calculated, tracing the locus of centroid which changes with variations in voice. The locus is adopted as a pattern of characteristics and compared by pattern matching with a pattern or locus of centroid of vocal frequency spectra which has been recorded beforehand in a memory device. In so doing, a humming distance (i.e. the sum of the absolute values of the differences of the two patterns) is calculated to judge the identity of a person according to the length of the distance.

BRIEF DESCRIPTION OF THE DRAWINGS

FIGS. 4–12 are diagrams of circuits used in the system of FIG. 1.

DETAILED DESCRIPTION OF THE PRESENT INVENTION

Figure 1:
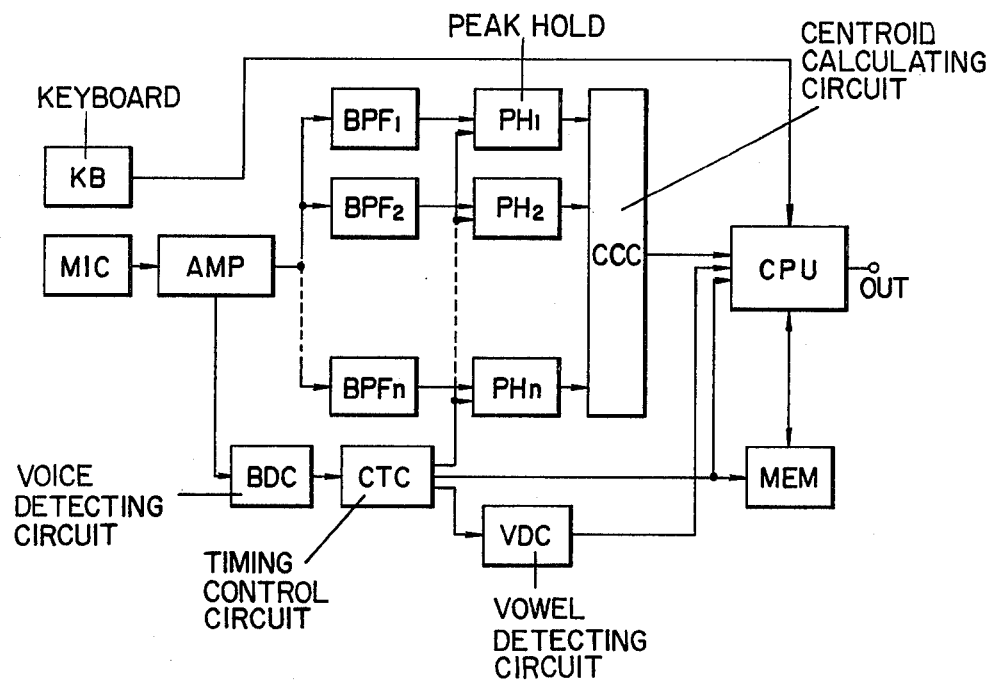
FIG. 1 is a block diagram showing an embodiment of the present invention.
Figure 2:
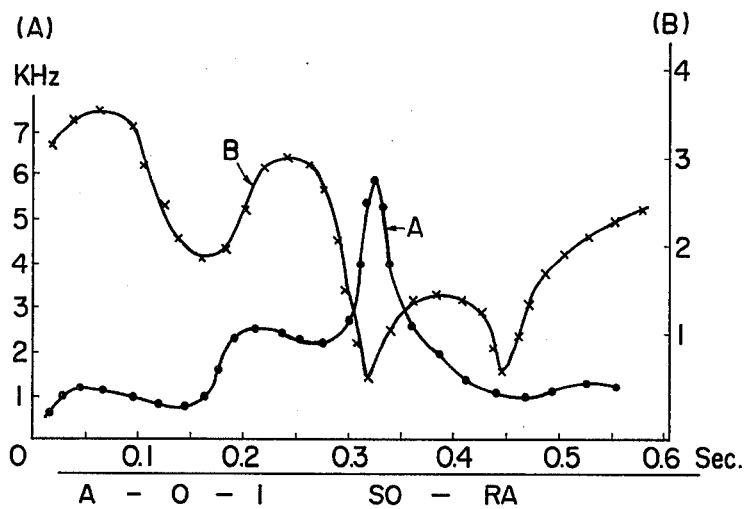
FIG. 2 is a graphic illustration of an example of the locus of centroid of frequency spectra as used in the present invention.

FIG. 1 is a block diagram of an embodiment of the instant invention. A microphone MIC converts the voice of a speaker into electrical signals which are amplified by an amplifier AMP, having automatic gain control to normalize the output therefrom. The signals are frequency-analyzed by a filter bank consisting of $n$ band-pass filters, $BPF_1$ to $BPF_n$. The peak values of the signals passed by the filters are stored in one of the $n$ respective peak value hold circuits $PH_1$ to $PH_n$, and are applied to a centroid calculating circuit CCC to calculate the centroid of frequency spectrum in each sampling. Assuming that the peak value of the $i$th filter is $Ai$ and the center frequency is $fi$, the average frequency $\overline{Ft}$ can be obtained, for example, from $\Sigma Aifi/\Sigma Ai$ and the average amplitude $\overline{At}$ can be obtained, for example, from $\Sigma Ai/n$. These two calculated values represent the instantaneous centroid of frequency spectrum. These values can be converted to digital amounts. The position of the centroid of the frequency spectrum (average frequency and average amplitude) varies with time or from one sampling period to the next. Thus, by having a speaker utter a particular word or sentence, a locus of centroid as shown, for example in waveforms A and B in FIG. 2, is obtained. In FIG. 2, waveform A shows an example of the loci of average frequency, and waveform B shown average amplitude for a voice saying "A-O-I SO-RA". As seen in the graph the sampling period is approximately 0.02 seconds. The period, however, is not critical. The successively calculated centroid values are temperorily stored in the CPU. In the case where the voice is being recorded for use at a later time, the successive centroid values constituting a locus of centroid of the frequency spectrum, are stored in a memory MEM. The storage address within MEM is selected conventionally by means of a keyboard KB connected to the CPU.

In case the person, whose voice pattern has been recorded as above, desires access to the security location or the like, that person can prove his identity by keying into the keyboard the address of his recorded voice pattern and speaking the aforementioned phrase into the microphone. As a result, the apparatus calculates a new locus of centroid for the voice input and reads out the previously recorded locus of centroid from the memory MEM. The two are compared to determine if the person seeking access is the same as the one whose voice pattern was recorded previously. For example assuming that a locus of centroid of a voice of a person A is recorded at the address of "1342" of the memory device, the person A who desires the identification punches sequentially the four figures "1342" on the address selecting keyboard KB to cause the memory to read out the memorized pattern or locus of centroid to the processing unit CPU. The pattern is, as mentioned hereinbefore, in digital form of the locus of centroid of frequency spectra which consists of the loci of an average amplitude and an average frequency as at A and B of FIG. 2. Then, the person A speaks into the microphone MIC, saying the same word or group of words as he previously recorded. The locus of centroid of frequency spectra of the spoken word or sentence is computed completely in the same manner as described hereinbefore. The freshly obtained pattern of locus of centroid is also fed to the processing unit CPU for a matching operation. More particularly, the processing unit computes a sum (or humming distance) of the absolute values of the two patterns and produces an output indicating the result; namely, affirming the identity if the humming distance is within a predetermined range and denying the identity when the humming distance exceeds a predetermined value.

The most important point in the recognition system of the present invention resides in the manner of matching the pattern of locus of centroid which is recorded in the memory device MEM with the newly input pattern of locus of centroid. The present invention operates to detect a personality in the flow of speech as a whole rather than in a particular vocal sound which is uttered by a person to be identified. Therefore, the level or strength of the input voice hardly influences the results since the level of the input voice is adjusted by the automatic gain control of the amplifier AMP, and a vowel firstly appearing in the uttered voice is detected by the vowel detecting circuit VDC of FIG. 1 to make necessary corrections according to a ratio of a frequency spectrum of a stationary portion of the uttered vowel to that of the recorded voice. A voice detecting circuit BDC is provided for producing a variety of control signals through a control signal generating circuit CTC thereby to specify the initiation and termination of the centroid computing operation. The vowel detecting circuit VDC is provided for detecting a vowel which is necessary for making corrections of the pattern of locus of centroid as mentioned before.

The pattern of locus of centroid thus obtained substantially corresponds to the recorded one if they are of the same person. However, in order to correct errors, an optimum humming distance may be set person by person. In such a case, there will be obtained an individual recognition system of extremely high precision.

The computation of the humming distance between the recorded pattern and the newly inputted pattern may be performed by a standard minicomputer. Due to the speed of such known devices, the result can be obtained within 200 to 300 ms after detection of the vocal ending of the word.

The CPU performs the straight forward calculation:

$$l_H = \sum_{i=1}^{n} \sqrt{|\overline{Fi} - \overline{Fi^*}|^2 + |\overline{Ai} - \overline{Ai^*}|^2}\ ;$$

where:

$l_H$ is the humming distance between a recorded locus of centroid of frequency and a newly inputted locus of centroid of frequency;

$\overline{Fi}$ is the average frequency of the input pattern at the "ith" position;

$\overline{Fi^*}$ is the average frequency of the standard or recorded pattern at the "ith" position;

$\overline{Ai}$ is the average amplitude of the input pattern at the "ith" position;

$\overline{Ai^*}$ is the average amplitude of the standard or recorded pattern at the "ith" position.

Figure 3:
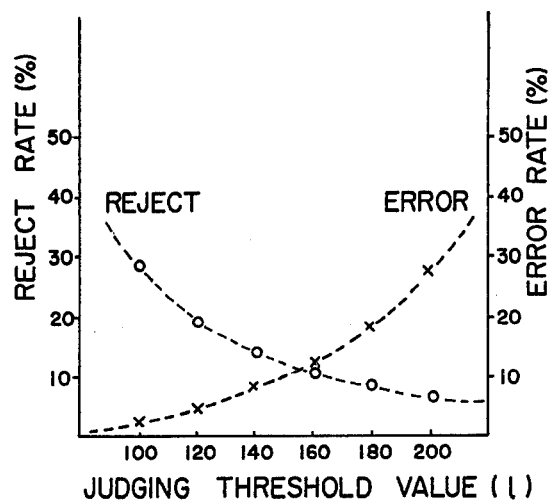
FIG. 3 is a graph of reject rate and error rate determined during an experiment of the present invention.

The determination of a threshold humming distance, i.e. a distance smaller than the threshold indicates positive identification, can be easily decided upon experimentally by having a person speak the key phrase several times, calculating the pattern of locus of centroid each time, determining an average or standard pattern, and then carrying out recognition tests with several people while noting the $l_H$ calculated for the different tests, and then selecting an $l_H$ threshold at a point which gives minimum erroneous recognition of a wrong person (called "error") and minimum rejection of the true person (called "rejects"). As a specific example, tests were conducted with the above described system by having 10 people utter the phrase "A-O-I SO-RA" 50 times each. A standard pattern using the average of three measurements previously taken was stored for each person in memory at selected respective addresses. During the 500 test utterances the values of $l_H$ were calculated and the reject and error rates were calculated. The latter is shown in FIG. 3. The two curves cross at $l_H = 157$ where the error rate and reject rate are 11.3%. This means that for $l_H = 157$ the accurate distinguishing rate was 88.7%.

It will be appreciated by anyone of ordinary skill in the art that the individual blocks making up the system of FIG. 1 are known functional units and do not per se constitute the novel feature of the present invention. However for the sake of specificity, several examples of the elements are shown in FIGS. 4–12. Inasmuch as these circuits are not per se novel and further inasmuch as their operation will be understood from the drawings, detailed verbal descriptions have been omitted.

Figure 4:
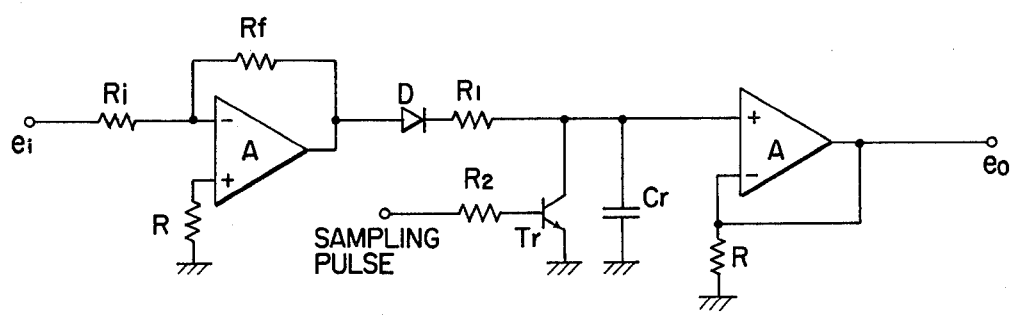
Figure 5:
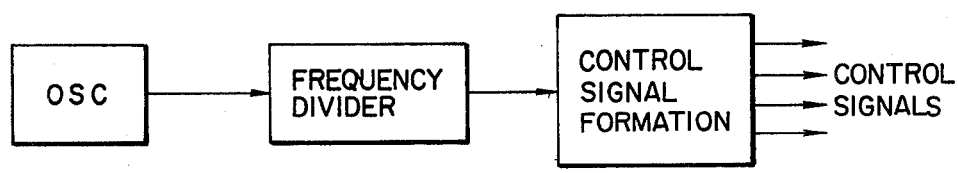
Figure 8:
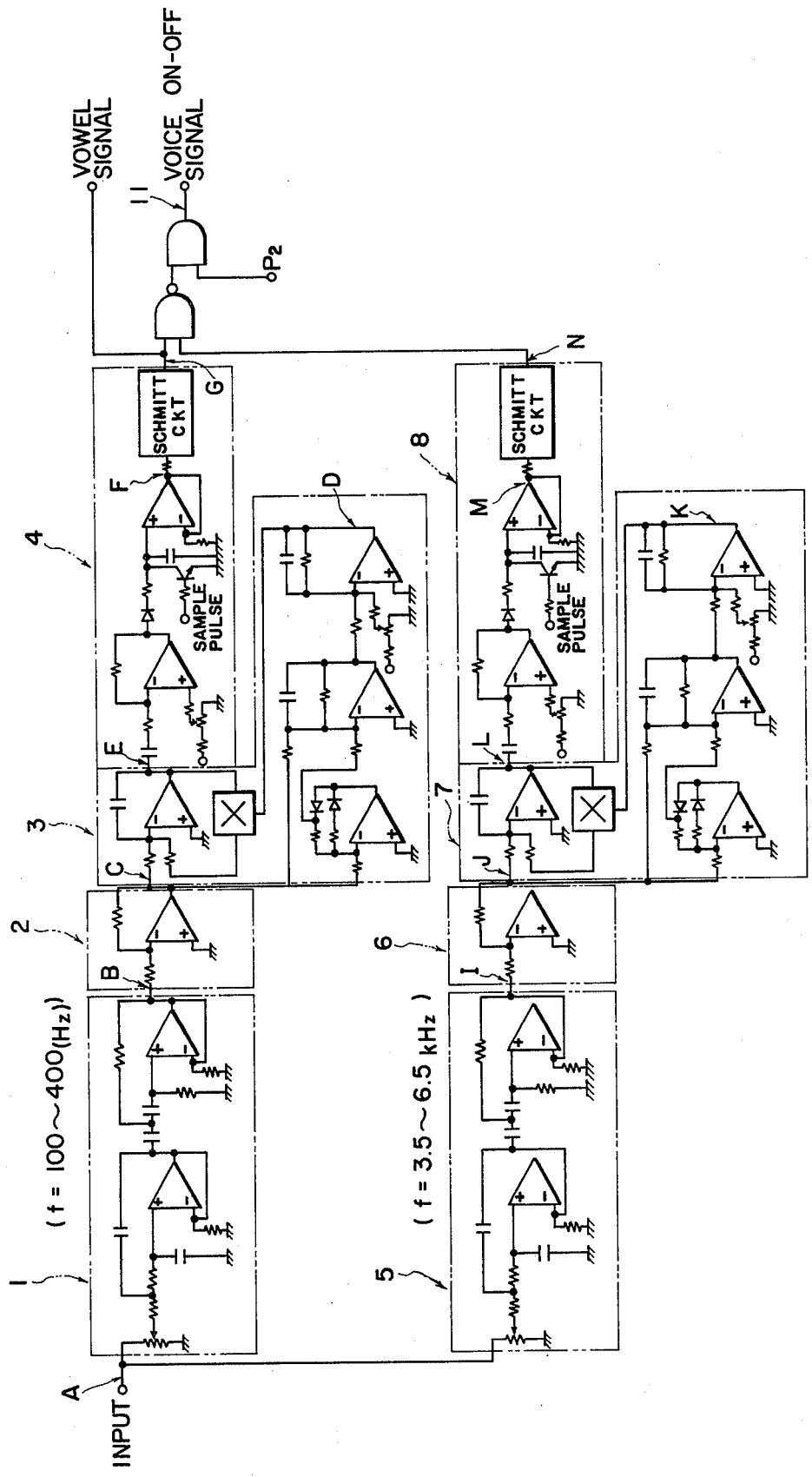
Figure 9:
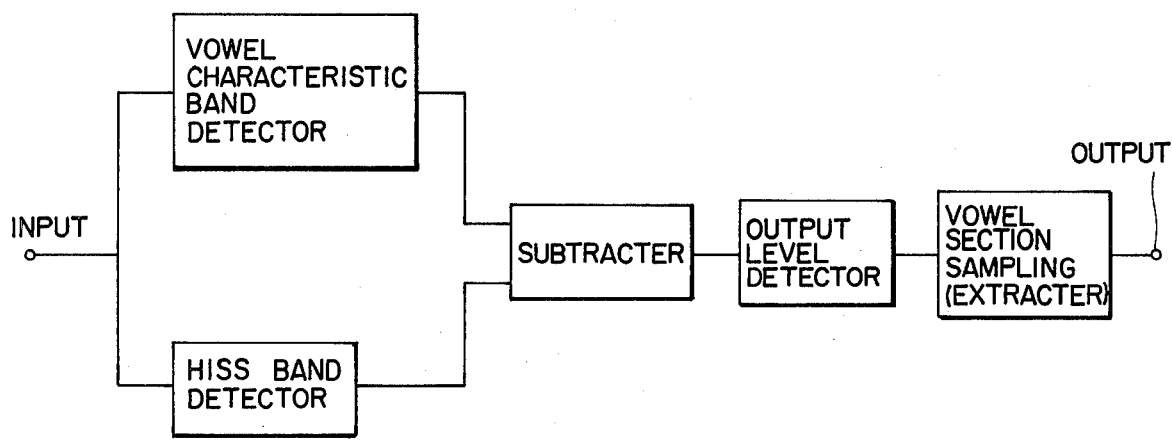
Figure 11:
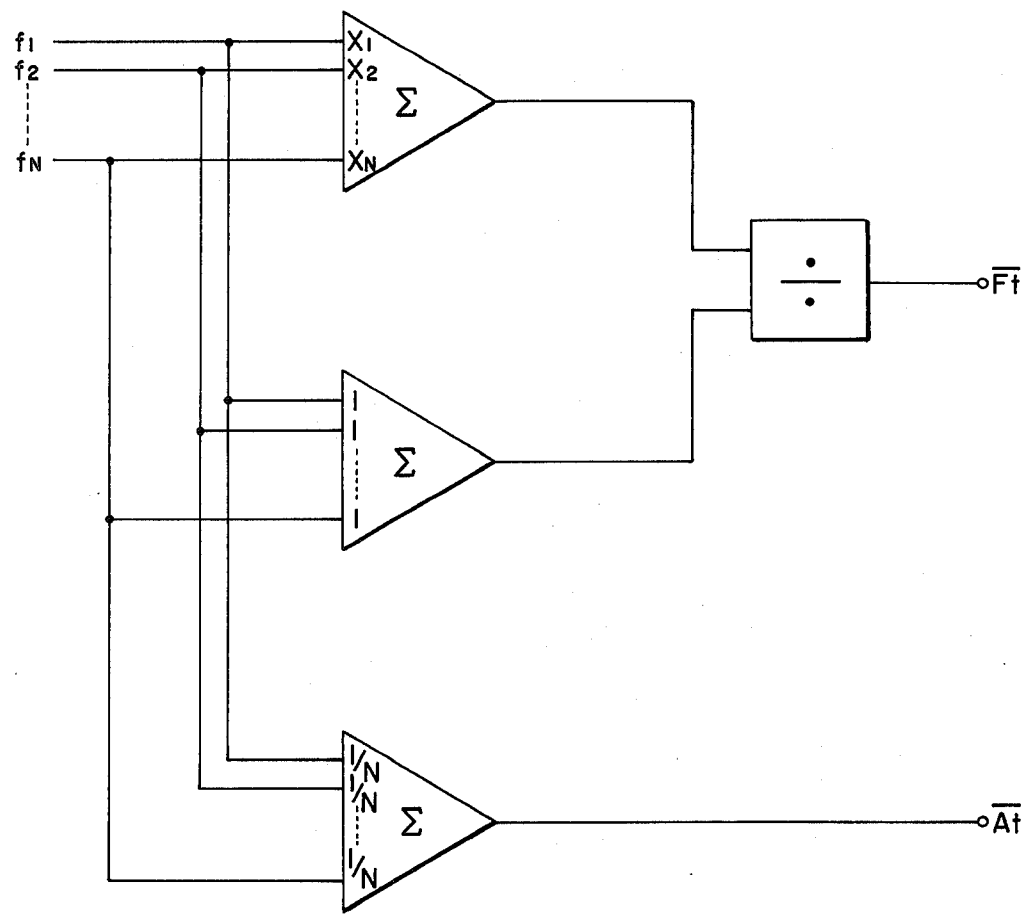
Figure 12:
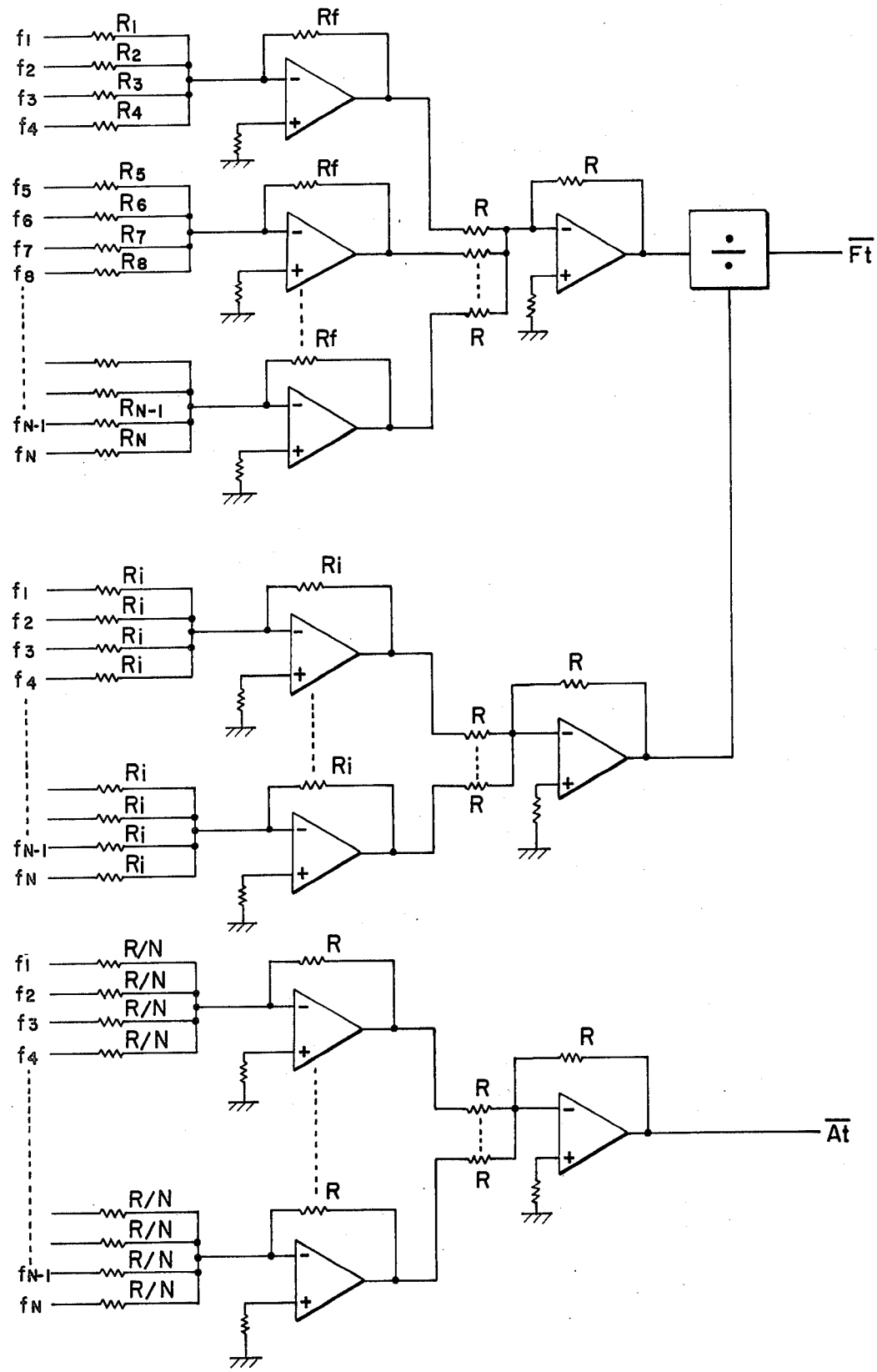

FIG. 4 shows a specific example of a suitable peak holding circuit pH, which responds to the sample pulses from the control timing generator CTC. A simple block diagram of the latter is illustrated in FIG. 5, with a more detailed block diagram of the same CTC generator shown along with a timing diagram in FIG. 6. A conventional voice detector BDC is shown in general block form in FIG. 7 and more specifically in FIG. 8. The vowel detector VDC is shown generally at FIG. 9 and specifically, along with its timing diagram, at FIG. 10. The centroid computing circuit, which computes $\overline{F}_t$ and $\overline{A}_t$, is shown generally in FIG. 11 and specifically in FIG. 12.

It will be understood from the foregoing description that, according to the invention, a person can be identified simply by matching a locus of a varying centroid of vocal frequency spectra with a recorded pattern of a similar nature, and in a more simplified manner than in conventional counterparts which employ an increased number of parameters, thus contributing to the realization of a recognition system of high precision. Furthermore, the precision of recognition will be improved all the more by using a special secret word or sentence for each person.

What is claimed is:

1. A voice recognition system comprising first means for periodically detecting the average frequency and average amplitude of at least a first voice signal to obtain a locus of the centroid of frequency spectra of said first voice, means for storing said locus, means for calculating a humming distance between a selected stored locus of the centroid of frequency spectra and a locus of the centroid of frequency spectra of a second voice detected by said first means, means for comparing said humming distance to a preselected value, a humming distance below said preselected value being accepted as an indication that both loci were detected from voice signals from a single person.

2. A voice recognition system as claimed in claim 1 wherein said means for periodically detecting comprises, a bank of band pass filters for dividing a voice signal into frequency components $f_1 \ldots f_n$, a bank of peak holding circuits, each connected to detect the peak amplitude during a sample period of the respective components $f_1 \ldots f_n$, and centroid generating means for calculating during each sample period, the average amplitude and the average frequencies based on the peak values obtained by the peak holding circuits.

3. A voice recognition system as claimed in claim 2 wherein said centroid generating means for calculating comprises first means for calculating the average frequency $\overline{F}_t = \Sigma A i f i / \Sigma A i$ and second means for calculating the average amplitude $\overline{A}_t = \Sigma A i / n$, where $n$ is the number of frequency components $f_1 \ldots f_n$, $Ai$ is the peak value at center frequency $fi$, and the sum $\Sigma$ is taken from $i-1$ to $i-n$.

4. A voice recognition system as claimed in claim 3 wherein the means for calculating the humming distance is a computer which calculates:

$$l_H = \sum_{i=1}^{n} \sqrt{|\overline{F}i - \overline{F}i^*|^2 + |\overline{A}i - \overline{A}i^*|^2};$$

where:
- $l_H$ is the humming distance between a recorded locus of centroid of frequency and a newly imputted locus of centroid of frequency;
- $\overline{F}i$ is the average frequency of the input pattern at the "ith" position;
- $\overline{F}i^*$ is the average frequency of the standard or recorded pattern at the "ith" position;
- $\overline{A}i$ is the average amplitude of the input pattern at the "ith" position;
- $\overline{A}i^*$ is the average amplitude of the standard or recorded pattern at the "ith" position.

* * * * *